March 17, 1942.　　A. W. STURMAN　　2,276,433
VALVE STRUCTURE
Filed July 3, 1940　　3 Sheets-Sheet 1
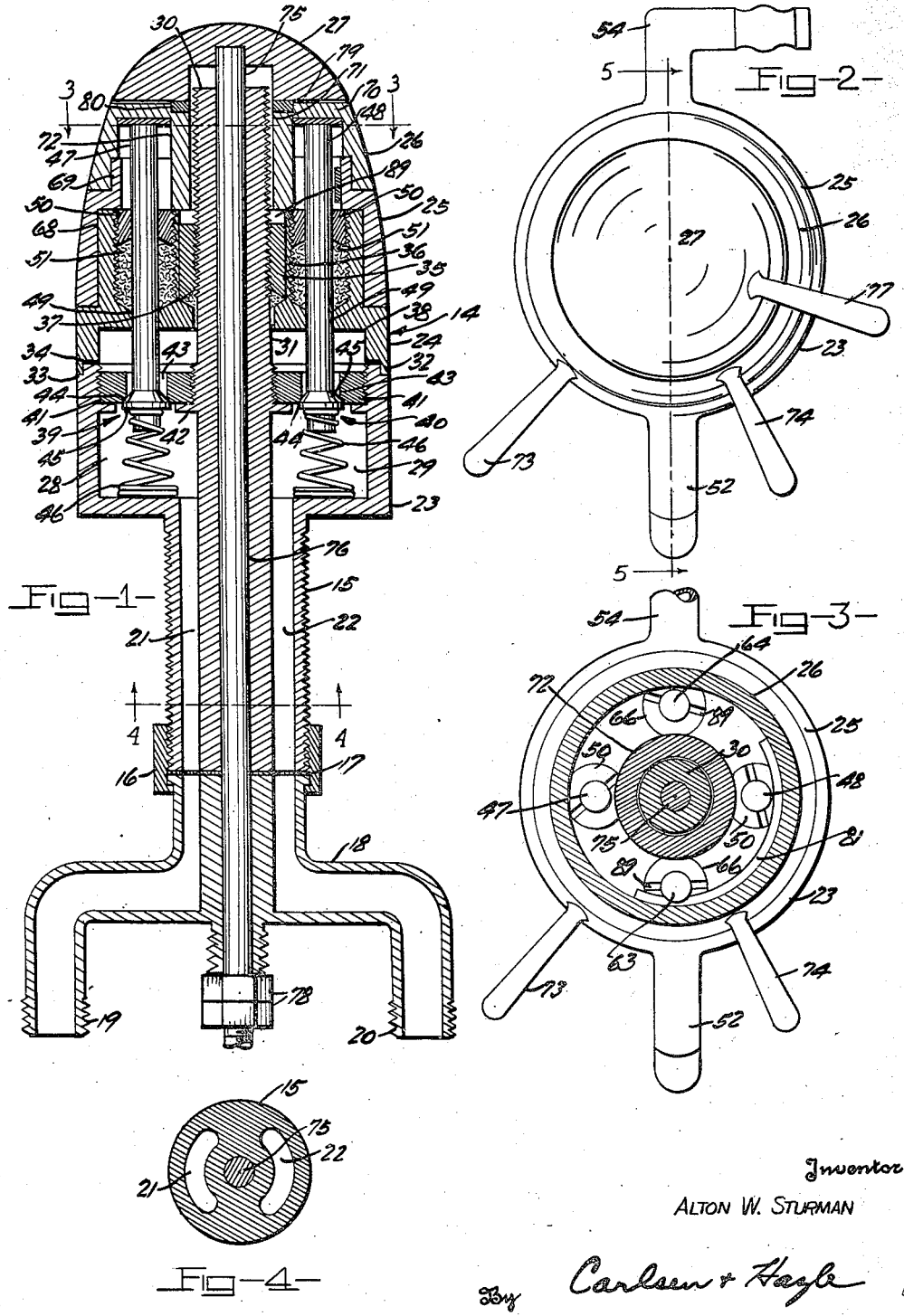
Inventor
ALTON W. STURMAN
By Carlsen & Hagle
Attorney

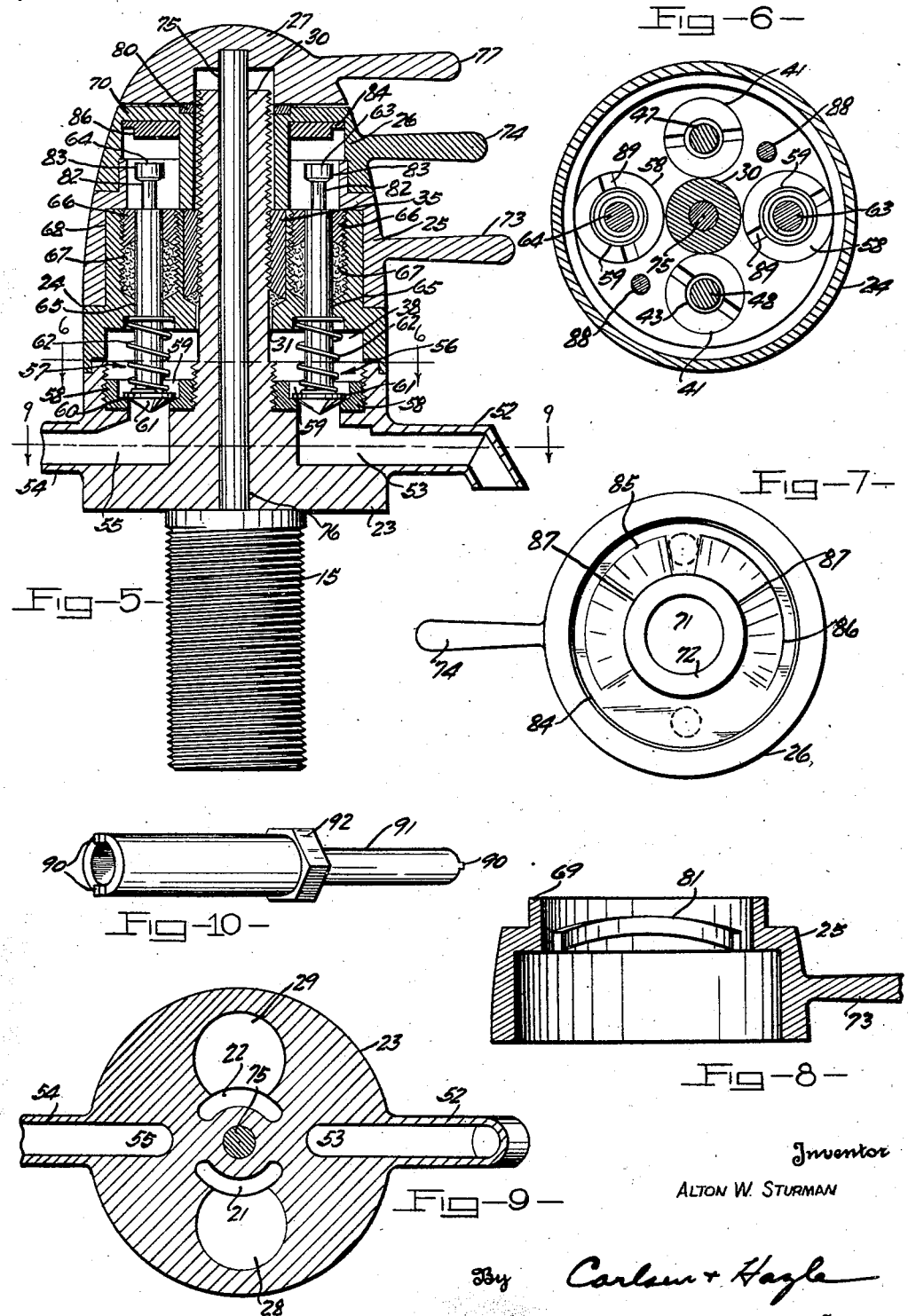

March 17, 1942. A. W. STURMAN 2,276,433
VALVE STRUCTURE
Filed July 3, 1940 3 Sheets-Sheet 3
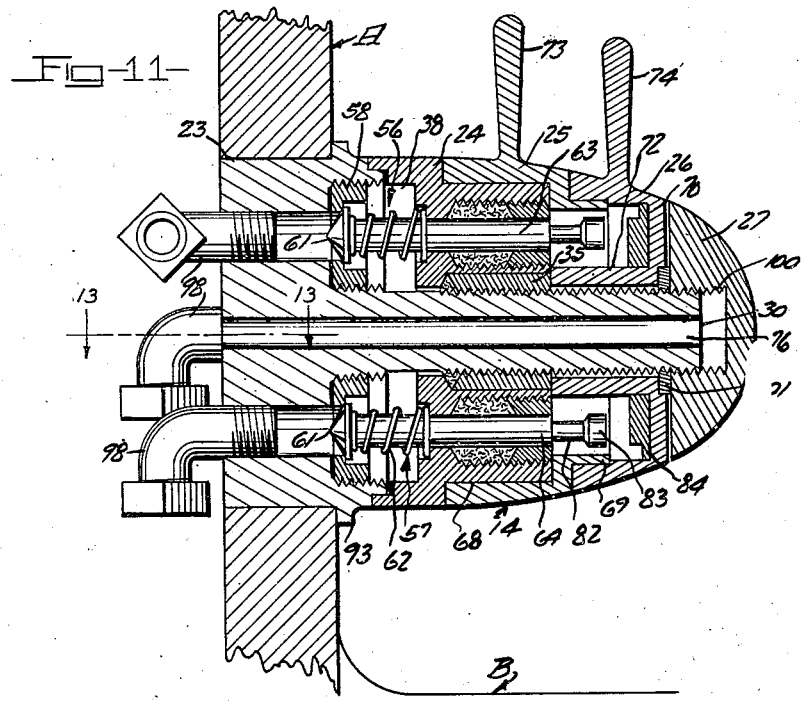
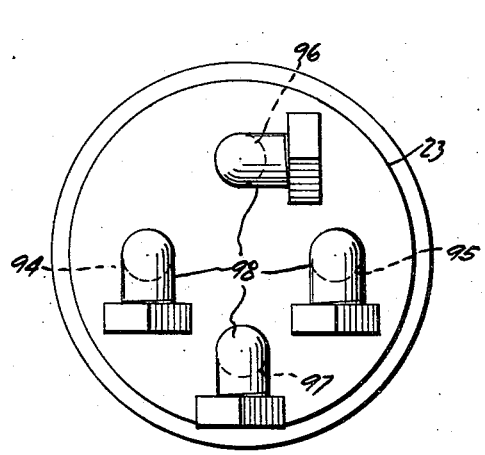
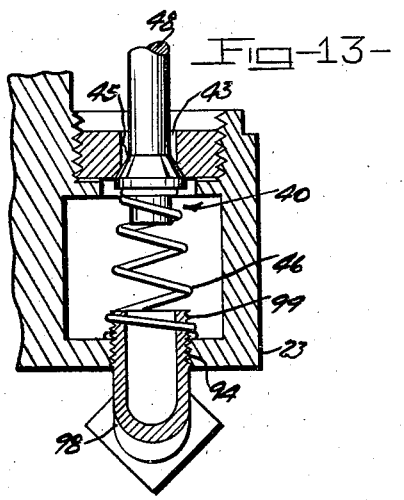
Inventor
ALTON W. STURMAN
By Carlsen & Hayle
Attorney Patented Mar. 17, 1942

2,276,433

UNITED STATES PATENT OFFICE 2,276,433

VALVE STRUCTURE

Alton W. Sturman, Minneapolis, Minn.

Application July 3, 1940, Serial No. 343,809

8 Claims. (Cl. 277—20)

This invention relates to improvements in valves and the primary object is to provide a valve for use in connection with lavatory, sink, bath tub or similar appliances for controlling the water flow and mixing and controlling water flow to the receptacle or to an auxiliary appliance such as a shampoo spray or shower. Another object is to provide a valve of this kind of exceptionally durable and efficient structure and designed to give long and trouble free service. A further object is to provide a valve of novel and functional design in a compact and ornamental form well adapted to blend nicely into the modern trend of ornamental design. Still a further object is to provide a valve of this kind which may by simple modification be adapted to use on older types of equipment having exposed faucets and the like and to the newer types of equipment having concealed piping outlets and the like and which may be arranged to provide, in addition to control handles for the valves, a convenient control means for the waste valve where such is used.

These and other more detailed and specific objects will be disclosed in the course of the following specification, reference being had to the accompanying drawings in which—

Fig. 1 is a vertical, diametrical cross section through the valve showing related connections for hot and cold water inlets.

Fig. 2 is a top plan view of the valve.

Fig. 3 is a horizontal cross section along the line 3—3 in Fig. 1.

Fig. 4 is a cross section along the line 4—4 in Fig. 1.

Fig. 5 is a diametrical section along the line 5—5 in Fig. 2.

Fig. 6 is a cross section along the line 6—6 in Fig. 5.

Fig. 7 is an inverted plan view of the inlet valve operating member alone, showing the cam surfaces thereon, and indicating in dotted lines the positions of the valve stems relative to said cam surfaces.

Fig. 8 is a diametrical cross section through the outlet valve operating member alone, also showing the cam surfaces thereon.

Fig. 9 is a cross section along the line 9—9 in Fig. 5.

Fig. 10 is a perspective view of a tool for removing and adjusting parts of the valve.

Fig. 11 is a sectional view similar to Fig. 5, but showing a modified valve structure designed for use in connection with concealed fittings and showing the same as arranged in a wall over a lavatory.

Fig. 12 is a rear or inner end view of the valve of Fig. 11.

Fig. 13 is an enlarged fragmentary section taken along the line 13—13 in Fig. 11.

Referring now more particularly and by reference characters to the drawings, my valve structure is seen, in the embodiment shown in Figs. 1 through 10, to comprise a main body structure 14 having a depended, threaded extension 15 adapted to be coupled by a compression nut 16 and washer 17 to a branch or Y-fitting 18. The fitting 18 has separate connecting means at 19—20 for hot and cold water piping (not shown) and the hot and cold water are separately led through the fitting and upwardly through ducts 21—22 in the extension 15 into the valve proper, there to be distributed as will appear.

The valve body comprises as its main elements a base member 23, a head member 24, an outlet valve operating member or ring 25, an inlet valve operating member 26 and a cap 27. It is the base which carries the extension 15 and the ducts 21—22 lead into openings or cavities 28—29 in the base opening upwardly through the flat upper surface thereof. The base carries a centrally located and upwardly extended post member 30, and the head member 24 has a central opening 31 to clear the post and slips over the base with a marginal lip 32 entering a circumferential groove 33 in an upper edge of said base. A gasket 34 seats between the head and base inwardly of the lip 32 and the parts are drawn together tightly by a tapped collar 35 which is threaded down over the post 30 into a recess 36 in the head. Packing 37 is compressed by the collar 35 to seal around the post 30.

The underside of the head member 24 is recessed as designated at 38 thus providing above the base a cavity or recess into which the water way enter through the openings 28—29. For controlling this water entrance I provide hot and cold water valves or inlet valves represented generally at 39—40 and which are located in said openings 28—29. It is to be understood, of course, that the hot or cold water may be connected to either branch of the fitting 18 and the use of the terms "hot" and "cold" in connection with the valves and other parts is therefore purely for convenience in description.

The valves 39—40 comprise valve seat members or plugs 41 which are screwed into the tapped upper ends of the openings 28—29 downwardly against marginal inturned lips 42 therein and these plugs are provided with central openings 43 faced off at lower ends to provide valve seats 44. The valves themselves take the form of trunco-conical heads 45 which are urged to the seats 44 by expansion coil springs 46 braced against the lower sides of the valves and disposed within the openings 28—29 as clearly shown in Fig. 1. Valve stems or plungers 47—48 extend upwardly from the respective valves 39—40 and are formed as extensions of the heads 45 and are of lesser diameter than the openings 43 to provide clearance therethrough when the valves are opened. These stems 47—48 extend slidably upward through bores 49 in the head member 24 and through packing collars 50 which are threaded in enlarged and tapped upper ends of the bores to compress packing 51 around the stems. The stems project some distance above the upper end of the head members at their upper ends, as clearly shown.

The base 23 has on one side an outlet or spout 52 which communicates with an opening or cavity 53 in the base and has at a substantially diametrically opposed point a spray or service outlet pipe or coupling 54 which likewise communicates with an opening 55 in the base. These openings, like the inlet openings 28—29, open upwardly through the upper side of the base but are spaced between the said inlet openings as best seen in Fig. 9. The openings 53—55 are provided with outlet valves designated generally at 56—57 (Fig. 5) which comprise plugs or seat members 58 screwed into enlarged upper ends of the openings and provided themselves with central openings 59 formed with upwardly faced valve seats 60. The valve heads 61, of conical shape, enter the openings 59 loosely and are urged against the seats 60 by expansion coil springs 62 which are braced between the valve heads and the head member 24 and are coiled around the valve stems 63—64. Said stems 63—64, extending upwardly from the heads 61 of the respective valves 56—57, are passed slidably through bores 65 in the head member 24 and upwardly through packing collars 66 which thread into the bores and compress packing 67 around the stems. These stems also project upwardly above the upper end of the head member 24 although to not as great distance as the aforesaid valve stems 47—48.

It will be evident that the inlet valves 39 and 40 may be opened by downward movement of their stems 47—48 while opposite upward movement of the stems 63—64 will open the outlet valves 56—57. As the valves are opened water entering through the ducts 21—22 will first flow upwardly from the openings 28—29 into the recess 38 above the base 23 and then will flow back down through the valves 56—57 to the openings 53—55 and out through the outlets 52—54. The water pressure is always exerted on the valves in a direction having a tendency to close them and this action, together with the metal-to-metal seating of the valves, greatly increases the effectiveness and useful life of the structure.

The outlet valve operating member 25 takes the form of a ring or annulus which seats upon and encircles a diametrically reduced upper end portion 68 of the head member 24. The upper end of the member 25 further is reduced and inset to overlie the upper end of the head member, thus providing an annular extension 69 just clearing the valve stems as clearly shown in Figs. 1 and 5. The inlet valve operating member 26 is likewise of ring-like shape and rotatably encircles the upper end extension 69 of the member 26 but the upper end of this latter member is closed as at 70 except for a central aperture 71 clearing the post 30. A collar or annular member 72 depends from this closed end 70 around the post 30 and rotatably bears upon the upper end of the head member 24. It is apparent that both of the members 25 and 26 are thus independently rotatable on the valve body and for thus moving the parts I provide them with radially extended operating handles 73 and 74 respectively.

The dome-like cap 27 surmounts the valve and in the present arrangement this cap is rigidly secured to the upper end of a rod 75 which depends through a bore 76 extended entirely through the center of the valve structure and through the center of the branch fitting 18. This cap carries also a radially extended handle 77 and by manipulating the handle the rod 75 may be turned within the valve. A lower end of the rod is connected by conventional means (not shown) to the usual "pop-up" waste valve (also not shown) of the sink, lavatory, or tub, with which my valve structure is used. Nuts 78 screwed on a lower end of the rod 75 upwardly engage the fitting 18 to prevent upward displacement of the cap 27 and the cap thus serves to retain the valve operating members in operative positions. The upper surface of member 26, around the opening 71 therein, is recessed annularly at 79 to receive a thrust washer or bearing 80 against which the cap 27 bears when the nuts 78 are drawn up.

The valve operating member 25 has, on the inner peripheral face of its end ring 69, a cam surface or rib 81 as best seen in Fig. 8, which rounds upwardly from each end toward the center. The outlet valve stems 63 and 64 have cut away or reduced portions 82 which clear this cam rib 81 but have the knob-like upper ends 83 adapted to ride the upper surface or edge of the cam rib. The arrangement is such that, when the handle 73 is turned toward the front of the valve, the cam rib 81 will stand medially between the valve stems 63—64 and in engagement with neither. Then as the handle 73 is turned to one side and the member 25 rotated the cam rib will move under the end 83 of one stem and will urge the same upward to draw the head 61 clear of the valve seat 60 and open the associated outlet valve 56 or 57. Opposite movement will open the other outlet valve and it will be apparent therefore that by manipulating this handle 73 the valve may be opened to either the spout outlet 52 or service outlet 54, the latter serving as a connection for a shampoo spray or shower (not shown).

A cam ring 84 is rigidly mounted against the annular underside of the closed end 70 of the valve operating member 26 and this ring has two arcuate cam surfaces 85—86 (Fig. 7) arranged end to end and each of which slopes downwardly from its ends to a medial nose portion 87. In the assembled relation of the valve parts the cam ring 84 overlies the upper end of the inlet valve stems 47—48 and in the position assumed by member 26 when the handle 74 projects straight forwardly from the valve toward the operator the adjacent ends of the cam surfaces 85—86 rest over the stem 48 while the stem 47 rests between the widely spread outer or opposite ends of said surfaces as indicated in dotted lines in Fig. 7. Movement of the handle in either direction (and of course oscillation of the inlet valve operating member 26) will then move one cam surface 85 or 86 over the valve stem 48 to urge the same downward and open the cold water valve 40 and permit the cold water to flow from either of the outlets 52 or 54 according to the position of the handle 73. Continuation of the movement will cause the other cam surface to similarly operate the valve stem 47 to open the hot water valve 39, meanwhile gradually shutting off the cold water as the cam nose 87 moves past stem 48. Cold water is normally admitted first and then gradually shut off as hot water enters to secure the desired mixing operation.

It will be noted that my valve structure presents all control handles in convenient juxtaposition and that by the tapering rounded shape given the body 14 it blends well with modern functional design. All water pressure is held below the head 24 and adequate sealing around the center post 30 and various valve stems is easily provided for. The head 24 and base 23 may be held in proper relation alignment by pilot pins such as indicated at 88 in Fig. 6.

The various packing collars 35, 50, and 66 as well as the valve plugs 43 and 58 all have radially extended notches 89 which may be engaged with the lugs 90 on either end of a tubular tool 91 shown in Fig. 10. This tool has faced surfaces 92 for a wrench and may be used for removing or seating any of these parts of the valve.

My valve structure also lends itself well to use in connection with modern concealed plumbing installations as shown in Figs. 11 to 13. The valve body 14 in this structure includes as heretofore described the base member 23, head member 24, outlet valve operating member 25, inlet valve operating member 26, and cap 27 and all valves and operating mechanism therefor are identical to those heretofore described. Like numerals are accordingly used as references.

The base 23, however, is adapted for mounting in the wall A over the tub or lavatory B and for this purpose has a marginal flange 93. The hot and cold water inlets are in this case extended through the base member in line with the corresponding inlet valves as shown at 94—95 while the two outlets are similarly formed as represented at 96—97. Elbows 98 are then screwed into these openings 94—95 and 96—97 for connection to the hot and cold water piping and to the piping leading to the water outlets or other fittings for tub or lavatory. As seen at 99 in Fig. 13, the elbows 98 leading into communication with the inlet valves, one of which is shown, are extended into the base to act as guides or pilots for the valve springs 46.

The foregoing arrangement places both inlets and outlets in direct line with the respective valves to provide the best possible water flow and disposes all piping in concealed position. The valve as a whole being of course in this case horizontally disposed, the handles 73—74 may be turned upwardly or downwardly as may be most convenient in each installation.

The cap 27 in this installation, as well as in any other desired, is provided with a tapped socket 100 by which it is screwed upon the extended end of the center post 30. A lock nut 101 replaces the thrust washer 80 to lock the cap against unscrewing as the valve member 26 is turned.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A valve structure comprising, a body portion having a chamber and having a plurality of inlet openings and a plurality of outlet openings communicating with the chamber, a valve movably mounted in each of the openings for controlling the flow of fluid from the inlet openings into the chamber and outwardly through the outlet openings, the valves in the inlet openings being arranged to open in a direction opposite to the valves in the outlet openings, stems extended from the valves, the stems of the outlet valves having knob-shaped upper ends, cam means engaging the ends of the inlet valve stems for urging the same in one direction to open the inlet valves, and separate cam means engaging the knob-shaped ends of the outlet valve stems for urging the same in an opposite direction to open the outlet valves.

2. A valve structure comprising, a base member having a plurality of inlet valves and a plurality of outlet valves mounted therein and including stems extended therefrom for movement in substantially parallel directions for opening the valves, a head member mounted on the base and slidably supporting the valve stems, and a pair of separate coaxially arranged, mutually supported annular members rotatably mounted on the head member, one of said annular members engaging the stems of the inlet valves for opening and closing the same and the other annular member engaging the stems of the outlet valves for selectively actuating the same.

3. A valve structure comprising, a base member having inlet valves and outlet valves mounted therein and including stems extended therefrom for movement in substantially parallel and opposite directions for opening the inlet and outlet valves, a head member mounted on the base and having bores clearing the valve stems, an annular member rotatably supported on the head member and having cam means for engaging the outlet valve stems and opening the said outlet valves, and an annular member rotatably supported on the first mentioned annular member and having cam means for engaging the inlet valve stems and opening the inlet valves.

4. A valve structure comprising a base member having inlet valves and outlet valves mounted therein, stems extended from the valves for opening and closing the valves, a head member on the base slidably supporting the valve stems, an annular operating member rotatably mounted on the head member, an arcuate cam on said annular member for engaging the sides of the stems of the outlet valves and operative to urge said stems endwise in response to rotation of the annular member and thereby operate the valves, another operating member rotatably mounted upon the first mentioned operating member and having an end portion, and cam means on said end portion for engaging the ends of the inlet valve stems and moving the same endwise in response to rotation of said other operating member and thereby opening and closing the inlet valves.

5. A valve structure comprising, a body portion having a chamber and having a pair of separate inlet openings and at least one outlet opening communicating with the chamber, a valve movably mounted in each of the openings for controlling the flow of fluid into and out of the chamber, the valves in the inlet openings being arranged to open by movement in one direction and the valve in the outlet opening being arranged to open by movement in the opposite direction, stems on the valves, spring means normally closing the valves, a cam device operatively engaging the stems of the inlet valves to move the same in one direction and open the inlet valves, and separately operable cam means engaging the stem of the outlet valve to open the same.

6. A valve structure comprising, a base member having inlet valves and outlet valves mounted therein, stems extended from the valves for movement in substantially parallel directions for opening the valves, a head member mounted on the base and slidably supporting the valve stems, a pair of coaxially arranged annular members supported on the head member and one having means for operatively engaging and actuating the inlet valve stems and the other having means for operatively engaging and actuating the outlet valve stems to thereby open the inlet and outlet valves, a cap member engaging one of the annular members to retain these members in assembly on the head member, and a rod extended from the cap member through the valve body, the said cap member being rotatably mounted for turning the rod.

7. A valve structure comprising, a base member having inlet valves and outlet valves mounted therein, stems extending from the valves for movement in substantially parallel directions for opening the valves, a head member mounted on the base and slidably supporting the valve stems, a pair of coaxially arranged, mutually supported annular members rotatably mounted on the head member, one of said annular members operatively engaging the inlet valve stems to actuate the inlet valves and the other member operatively engaging the outlet valve stems to actuate the outlet valves, the said base member having a center post extending through the head member and annular valve operating members, and a cap engaging the post to urge the head and annular members toward the base.

8. A valve structure comprising a base member having a plurality of valve openings in one side, separate water inlet and outlet means in the opposite side of the base communicating with the valve openings, a head member on the base and having a central opening, a center post extending from the base through said opening, valves operatively arranged in the valve openings and having operating stems extending through the head member, separate operating members movably mounted on the head member, one operating member having means engaging said stems for operating a part of the valves, and the other operating member having means engaging the stems for operating the other valves, and means on the center post for holding the said operating members in place on the said head member.

ALTON W. STURMAN.